United States Patent [19]

Wood

[11] Patent Number: 5,233,663
[45] Date of Patent: Aug. 3, 1993

[54] SIMULTANEOUS INTERPRETATION SYSTEM

[76] Inventor: William H. Wood, 1621 Kalispell Ct., Sunnyvale, Calif. 94087

[21] Appl. No.: 676,815

[22] Filed: Mar. 28, 1991

[51] Int. Cl.$^5$ .............................................. H04B 3/00
[52] U.S. Cl. ..................................... 381/80; 381/74; 381/77; 381/82; 379/391
[58] Field of Search .................... 381/80, 81, 82, 74, 381/77, 86; 379/391

[56] References Cited

U.S. PATENT DOCUMENTS 3,720,788  3/1973  Hashimoto .
4,340,779  7/1982  Hashimoto et al. .
4,941,187  7/1990  Slater ..................................... 381/74

Primary Examiner—Jin F. Ng
Assistant Examiner—Edward Lefkowitz
Attorney, Agent, or Firm—Wood, Herron & Evans

[57] ABSTRACT

A simultaneous interpretation system includes a plurality of simultaneous interpretation stations interconnected with a multi-conductor bus which carries up to thirteen audio lines. One audio line designated FLOOR connects to a microphone into which a source language is spoken. An interpreter located in a booth operates station controls which interact with the system. The interpreter may input select FLOOR or any one of twelve LANGUAGE lines for input to a headset and may output-select any one of the twelve LANGUAGE lines for output via a microphone. A three position microphone switch provides selective routing of the interpreter's voice from the microphone to an output-selected LANGUAGE line during "active" simultaneous interpretation, or back to the headset of the interpreter when not "active." Each booth houses two interpreters working as a team, with parallel interconnected controls, and each interpreter hears the other interpreter when their microphones are both not in the "active" mode.

16 Claims, 8 Drawing Sheets

FIG. 7A

HEAR COM — SEND MIC

| QF TS \ CS AS | 00 | 01 | 11 | 10 |
|---|---|---|---|---|
| 00 (CON) | 0 | 0 | 0 | 0 |
| 01 | 0 | 1 | 1 | 1 |
| 11 | 0 | 1 | 1 | 1 |
| 10 | 0 | 0 | 0 | 0 |

FIG. 7B

HEAR COM — SEND NONE

| QF TS \ CS AS | 00 | 01 | 11 | 10 |
|---|---|---|---|---|
| 00 | 0 | 0 | 0 | 0 |
| 01 | 0 | 1 | 1 | 0 |
| 11 | 0 | 1 | 1 | 0 |
| 10 | 0 | 0 | 0 | 0 |

FIG. 7C

HEAR COM — SEND FLOOR

| QF TS \ CS AS | 00 | 01 | 11 | 10 |
|---|---|---|---|---|
| 00 | 0 | 0 | 0 | 0 |
| 01 | 0 | 1 | 1 | 0 |
| 11 | 0 | 1 | 1 | 0 |
| 10 | 0 | 0 | 0 | 0 |

FIG. 7D

SELECT — SEND MIC

| QF TS \ CS AS | 00 | 01 | 11 | 10 |
|---|---|---|---|---|
| 00 | 0 | 1 | 1 | 1 |
| 01 | 0 | 1 | 1 | 1 |
| 11 | 0 | 1 | 1 | 1 |
| 10 | 0 | 1 | 1 | 1 |

FIG. 7E

SELECT — SEND NONE

| QF TS \ CS AS | 00 | 01 | 11 | 10 |
|---|---|---|---|---|
| 00 | 0 | 1 | 1 | 0 |
| 01 | 0 | 1 | 1 | 0 |
| 11 | 0 | 1 | 1 | 0 |
| 10 | 0 | 1 | 1 | 0 |

FIG. 7F

SELECT — SEND FLOOR

| QF TS \ CS AS | 00 | 01 | 11 | 10 |
|---|---|---|---|---|
| 00 | 0 | 1 | 1 | 0 |
| 01 | 0 | 1 | 1 | 0 |
| 11 | 0 | 1 | 1 | 0 |
| 10 | 0 | 1 | 1 | 0 |

FIG. 7G — HEAR LANG / SEND MIC

| QF TS \ CS AS | 00 | 01 | 11 | 10 |
|---|---|---|---|---|
| 00 | 1 | 1 | 1 | 1 |
| 01 | 1 | 0 | 0 | 0 |
| 11 | 0 | 0 | 0 | 0 |
| 10 | 0 | 0 | 0 | 0 |

FIG. 7J — HEAR FLOOR / SEND MIC

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 0 |
| 10 | 1 | 1 | 1 | 1 |

FIG. 7H — HEAR LANG / SEND NONE

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7K — HEAR FLOOR / SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 1 |
| 10 | 1 | 1 | 1 | 1 |

FIG. 7I — HEAR LANG / SEND FLOOR

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7L — HEAR FLOOR / SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 1 | 0 | 0 | 1 |
| 10 | 1 | 1 | 1 | 1 |

FIG. 7M

HEAR SELF — SEND MIC

| QF TS \ CS AS | 00 | 01 | 11 | 10 |
|---|---|---|---|---|
| 00 | 0 | 0 | 0 | 0 |
| 01 | 0 | 1 | 1 | 1 |
| 11 | 0 | 1 | 1 | 1 |
| 10 | 0 | 0 | 0 | 0 |

FIG. 7N

HEAR SELF — SEND NONE

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7O

HEAR SELF — SEND FLOOR

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7P

HEAR FLR MIX — SEND MIC

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7Q

HEAR FLR MIX — SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7R

HEAR FLR MIX — SEND FLOOR

| QF TS \ CS AS | 00 | 01 | 11 | 10 |
|---|---|---|---|---|
| 00 | 1 | 1 | 1 | 1 |
| 01 | 1 | 0 | 0 | 1 |
| 11 | 0 | 0 | 0 | 0 |
| 10 | 0 | 0 | 0 | 0 |

FIG. 7S

SPEAK LANG — SEND MIC

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7U

LINE SIEZE — SEND MIC

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7T

SPEAK LANG — SEND NONE

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7V

LINE SIEZE — SEND NONE

| QF TS \ CS AS | 00 | 01 | 11 | 10 |
|---|---|---|---|---|
| 00 | 1 | 1 | 1 | 1 |
| 01 | 1 | 1 | 1 | 1 |
| 11 | 1 | 1 | 1 | 1 |
| 10 | 1 | 1 | 1 | 1 |

FIG. 7V

SPEAK LANG — SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

FIG. 7W

LINE SIEZE — SEND FLOOR

| QF TS \ CS AS | 00 | 01 | 11 | 10 |
|---|---|---|---|---|
| 00 | 0 | 0 | 0 | 0 |
| 01 | 0 | 0 | 0 | 0 |
| 11 | 0 | 0 | 0 | 0 |
| 10 | 0 | 0 | 0 | 0 |

SIMULTANEOUS INTERPRETATION SYSTEM

FIELD OF THE INVENTION

This invention relates to a simultaneous interpretation system, and more particularly, to an improved simultaneous interpretation system which facilitates interpreter interaction with the system and other interpreters.

BACKGROUND OF THE INVENTION

Simultaneous interpretation generally refers to the hearing of a first language while interpreting into another. Simultaneous interpretation was first used at the Nurenberg war crimes trials after World War II. Since that time, simultaneous interpretation has played an important role in removing the communication barriers between a speaker and a listener who do not understand a common language. Some politicians credit the use of simultaneous interpretation with playing a major role in the "thawing" of the Cold War between the U.S. and the U.S.S.R.

Simultaneous interpretation systems have evolved in complexity over the years. However, the major objectives of these systems remain the same. That is, these systems attempt to facilitate oral communication between at least two parties who do not understand a common language. To accomplish this goal, simultaneous interpretation systems employ simultaneous interpreter operating stations which are out of the line of sight of listeners and electrically connected to a conduit carrying multiple conductors, one designated for source or the main speaker and the other designated for specific languages. The simultaneous interpreters listen to a source language through a headset and interpret a second language into a microphone. The second language is carried by a conductor which is operatively connected to an antenna that transmits to receivers coupled to headsets worn by listeners in the audience. If the listeners include people of multiple languages, multiple simultaneous interpreters must be employed, and multiple interpretations must be transmitted by the antenna and received by the headsets. The listeners select a channel that is understood.

If communication is bi-directional, each speaking participant also wears a headset and has access to one of a number of microphones. A mixer connected to all of the microphones ensures that only one microphone is "on" at a time.

In either one-directional simultaneous interpretation or bi-directional simultaneous interpretation, the success of the endeavor depends upon whether or not the "interpretation" spoken by the interpreter is simultaneous, or as near to simultaneous as humanly possible, with the words of the speaker. Although some breaks or pauses in interpretation are normal, the simultaneous interpreter should finish speaking shortly after the speaker in view of the listener has finished. It is also preferable to keep the interpreter out of the line of sight of the listeners. These two factors help to create the illusion of actual oral communication between the speaker and the listener, or at least to minimize the degree to which a listener is consciously cognizant of the fact that the interpretation is taking place.

For these reasons, the single most significant component of a simultaneous interpretation system is the human component, the simultaneous interpreter. Simultaneous interpretation requires a high degree of skill and proficiency in both the language voiced by a speaker and the language understood by the listeners, coupled with the ability to simultaneously listen to one language while speaking in another. This talent must be acquired, and it can only be learned by intensive, regimented training. One reason this talent is not easily learned is because individuals commonly rely upon "sidetone" or some audible feedback while speaking. However, simultaneous interpretation necessarily removes this sidetone. The fact that there are only about 2500 qualified simultaneous interpreters in the world attests to the difficulty of perfecting the skills required for this profession.

In addition to the language skills required by this profession, simultaneous interpreters must also be sufficiently technically skilled to interact with the electrical controls of the system. Even the best simultaneous interpreter would not succeed if he or she were not constantly aware of the on/off status of the microphone. Although this may seem to be a simple task, simultaneous interpreters are under a great deal of pressure to perform linguistically, and they often must make split second word choices. Then, during short breaks, the microphone is turned off so that the interpreter will not be heard. Thus, the concentration level fluctuates between a relatively relaxed state and a condition wherein concentration is focused entirely on the listening and speaking senses. Visual sensory perception is at a minimum.

Even though most simultaneous interpretation systems provide a red indicator lamp which lights when an interpreter is sending a voiced signal over a designated line, it is surprisingly common how often simultaneous interpreters are not aware of the condition of this visual indication of the on/off status of the microphone. Under other circumstances, it is also possible that either the indicating lamp or the microphone will malfunction. In such situations, even a visually perceptive simultaneous interpreter would not be sure if the microphone were connected to a language line.

Factors such as these further increase the tension and pressure under which simultaneous interpreters must work. As a result, there is an increased possibility of excessive time lag between the initiation of interpretation and commencement of speaking of a source language, or the increased possibility of missed interpretation altogether. This unnecessary tension and pressure could be eliminated if simultaneous interpreters had a better way of knowing the on/off status of the microphone.

It is therefore one object of this invention to provide a simultaneous interpretation system which heightens interpreter awareness of the on/off status of his or her microphone.

In many simultaneous interpretation systems, a pair of interpreters work as a team at each of the various stations. This is due to the fact that most simultaneous interpreters can interpret for only about twenty or thirty minutes without requiring equal rest time. During short breaks or other intervals, sometimes referred to as "dead" time, the two interpreters often confer with or prompt each other. However, the two interpreters must not remove their headsets during dead time because they might not hear the first few words when speaking commences. There are also occasions during interpretation when one interpreter reaches an impasse over a particular word or phrase and wishes to consult the partner. For example, one interpreter may have missed or not known the meaning of a word and he or she then decides to quickly consult the partner. Prompts of this type occur quite frequently between interpreters working as a pair.

With present known simultaneous interpretation systems, when this occurs, the two interpreters usually communicate by removing the headsets and shouting at each other. If either interpreter forgets to depress a mute/cough button on his or her respective microphone, this communication will be transmitted to the listeners. Furthermore, this type of verbal exchange is disruptive and may result in the team missing additional words.

It is another object of the invention to provide a simultaneous interpretation system which facilitates oral prompting between a pair of simultaneous interpreters working as a team.

One further obstruction to the training of simultaneous interpreters is the inability to place students in "live" situations while enabling an instructor to monitor interpretation progress and at the same time retain the ability to communicate effectively with the student.

It is therefore another object of the invention to provide a simultaneous interpretation system with increased communication versatility between an instructor station and one or more remote simultaneous interpretation stations to facilitate the teaching of simultaneous interpretation.

SUMMARY OF THE INVENTION

One aspect of this invention contemplates a simultaneous interpretation system wherein the voiced messages of a simultaneous interpreter spoken into a microphone are routed to a designated LANGUAGE line when the microphone is switched into a SEND mode, but the messages are fed back to the interpreter's headset if the microphone is not in a SEND mode. Because simultaneous interpreters are rigidly trained to hear one language and interpret into another language, this rerouting of local audio back to the interpreter's headset makes the interpreter immediately, audibly cognizant of whether or not the microphone is in a SEND mode.

Another aspect of the invention relates to facilitated oral prompting between a pair of simultaneous interpreters working as a team at a simultaneous interpretation station. Accordingly, the microphones and headsets of the two interpreters are interconnected so that local, voiced messages into either of the microphones are routed to both of the headsets when both microphones are not in a SEND mode. This facilitates oral prompting between the two interpreters by eliminating the requirement of prior systems that headsets be removed and a mute/cough button be depressed.

The interrelationship between, and the advantages of these two features become apparent when the following example is considered. A pair of interpreters are working as a team to translate German heard from a FLOOR onto a LANGUAGE line designated for English. If the first interpreter in the SEND mode hears a German word that is not understood, the first interpreter quickly switches out of the SEND mode and consults the partner, the second interpreter. Although the partner is not in a SEND mode, the parnter is listening to the signals from the FLOOR line. When the first interpreter switches out of SEND MICROPHONE, the partner is also able to hear the question from the first interpreter because, at the time of the question, both microphones are not in SEND MICROPHONE mode. If the answer is relatively quick, the first interpreter may resume interpreting. However, if he or she forgets to switch back into the SEND mode, this mistake becomes immediately apparent in an audible manner because the local audio is routed to the interpreter's headset, and he or she hears the local audio until switching back into SEND mode. Thus, if the interpreter inadvertently forgets to switch back into SEND mode, this mistake is immediately recognized and corrected.

To implement these features, this simultaneous interpretation system preferably utilizes a three position microphone switch to control routing of electrical signals generated in response to voiced messages from an interpreter spoken into the microphone. The three positions are designed SEND MICROPHONE, SEND FLOOR and NO SEND, although it is to be understood that other equivalent terms would be just as suitable.

In SEND MICROPHONE, the generated electrical signals from the microphone are conveyed to a selected one of up to twelve LANGUAGE lines. Generally, these twelve lines are designated for conveying the interpreted electrical signal corresponding to twelve languages. Each simultaneous interpretation station includes two sets of controls so that both members of the simultaneous interpretation team may interact with the system. When a particular LANGUAGE line has been output selected, assuming all other conditions are correct, that selected line receives the electrical signals from an interpreter's microphone when the microphone switch is in the SEND mode.

When in SEND FLOOR, the headset of the interpreter is hearing the source language from the speaker, which is carried on a line designated as FLOOR, and this mode of the microphone switch routes the source language to the LANGUAGE line that has been output selected by the interpreter. In most cases, an interpreter chooses this type of routing when the source language spoken by the speaker is the same language into which the interpreter normally interprets. This feature enables listeners tuned to the LANGUAGE line for that particular language to hear the speaker in that language without having to remove their headsets or switch to another channel. During this mode, the interpreter does not interpret.

When in NO SEND, neither the electrical signal on the FLOOR line nor the electrical signal generated by the interpreter's microphone is routed to any of the twelve designated audio lines. Preferably, electrical signals generated by voiced messages spoken into either interpreter microphone at the station are heard through both headsets of the station when both microphone switches are in either SEND FLOOR or NO SEND.

According to one preferred embodiment of the invention, this simultaneous interpretation system includes one or more FLOOR microphones, a mixer, a loudspeaker, a multi-conductor electrical bus, a plurality of acoustically-isolated simultaneous interpretation booths housing simultaneous interpretation stations, an antenna and a plurality of listener headsets. Spoken words of a source language are received by one or more FLOOR microphones and converted to electrical signals. The mixer ensures that electrical signals from only one of the microphones are conveyed along one of the conductors of the multi-conductor bus designated as the FLOOR line. Separately, electrical signals corresponding to the spoken words of the source language may be conveyed to the loudspeaker system. Up to twelve additional conductors or lines are designated as LANGUAGE lines, with each LANGUAGE line dedicated to one particular language to be used at the conference, speech presentation, etc. (i.e., the event).

Each of up to twelve acoustically-isolated simultaneous interpretation booths is located out of the line of sight between the listeners and the speaker, and each booth houses a simultaneous interpretation station interconnected with the multi-conductor bus. Although this simultaneous interpretation system provides versatility for interpreters in both listening and transmitting capability, it is common for only one booth to be used for each of the particular languages of the event. The antenna is also operatively interconnected to the multi-conductor bus, and the antenna is adapted to transmit up to twelve frequency encoded radio signals corresponding to the electrical signals conveyed along the designated LANGUAGE lines. Listeners in the audience wear headsets connected to receivers adapted to receive any one of the twelve channels from the antenna. Each listener simply locates a channel that he or she understands.

Each simultaneous interpretation station includes two sets of input and output controls interconnected to two headsets, two microphones and two microphone switches, thereby to accommodate two simultaneous interpreters working as a team inside the booth. The controls enable each interpreter in the booth to selectively receive on the headset an incoming electrical signal from any one of the thirteen audio lines designated FLOOR or LANGUAGE. Each interpreter may also transmit onto any one of the twelve audio lines designated as LANGUAGE lines. Generally, one interpreter at each station listens to the FLOOR line and interprets onto the LANGUAGE line appropriate for that particular booth and which has been selected by a twelve position rotary output control switch. To accommodate situations when an interpreter alternately interprets in both directions, i.e., from a first language to a second and vice versa, depending on the language spoken on the floor, the output controls for each interpreter provide two twelve position rotary switches ganged together to enable selective toggling between the two LANGUAGE lines dedicated to the first and second languages.

In some instances, an interpreter will not understand the language on the FLOOR line. He or she must transfer from the FLOOR input to a LANGUAGE line selected on a twelve position rotary input switch to receive a language that is understood. The interpreter then listens to the interpretation from the input selected LANGUAGE line and "reinterprets" onto an output selected LANGUAGE line. The intermediate language is referred to as a "relay."

Each interpreter microphone has a three position microphone switch with the three positions corresponding to the three modes SEND MICROPHONE, SEND FLOOR and NO SEND, which were previously described. As indicated, a lamp lights in one of three colors to indicate the position of the microphone switch. The lamp lights RED when the microphone switch is in a SEND MICROPHONE position, YELLOW in a NO SEND position and GREEN in a SEND FLOOR position.

Though each station has two sets of input/output controls operated by two simultaneous interpreters working as a team, normally only one of the interpreters will be in a SEND MICROPHONE position at a time. However, it is possible for both interpreters to be in SEND MICROPHONE, and this is in fact done, for instance, when a dramatic presentation requires two voices. When both interpreters are not in SEND MICROPHONE position, local audio spoken into either one of the interpreter's microphones is routed to both of the headsets within the booth. This enables two interpreters working as a team to confer with one another during dead time or during an impasse, without having to remove their headsets.

This system provides increased versatility in interacting with the FLOOR and up to twelve LANGUAGE lines. The system enables interpreters to monitor the performance of other interpreters by listening to an input-selected LANGUAGE line. Because every one of the interpreters may also output select any of the LANGUAGE lines, in emergency situations, an alternate interpreter from a separate booth may substitute for the interpreters of an interpreter team designated for a particular language. When a first interpreter output-selects a LANGUAGE line, a three color lamp indicates whether that LANGUAGE line is clear (GREEN), occupied by another interpreter (YELLOW) or in condition for the first interpreter to transmit (RED).

According to another preferred embodiment of the invention, one of the twelve interpretation stations is modified to serve as a TEACHER/CONTROL station. This embodiment is particularly useful in teaching students the art of simultaneous interpretation, and it enables an instructor at the TEACHER/CONTROL station to: i) listen in on any LANGUAGE line; ii) to talk to students who have output-selected that particular language line; or iii) to talk to all students at once.

The instructor's voice is conveyed on a CONTROL audio line. To speak to only those students who have output-selected one of the LANGUAGE lines, the instructor first chooses that LANGUAGE line by rotating a twelve position rotary switch at the TEACHER/CONTROL station. The instructor then depresses a TALK TO STUDENT button, which effectively tells the students on that LANGUAGE line to "listen to me." This step SELECTS the students on that particular LANGUAGE line. Alternately, the instructor may SELECT all students by depressing an ALL SELECT button.

Additionally after students have been SELECTED, the instructor may increase, decrease or reset volume levels, or the instructor may send a CHIME to get their attention.

For either embodiment of the invention, any one of a number of methods may be employed to affect the necessary switching capability. However, applicant has found it advantageous to employ programmed array logic (PAL) chips for controlling the logic of the system, and field effect transistors (FETs) switches for driving the audio lines. Preferably, four PAL chips are used at each station, with two PAL chips per interpreter.

These and other features of the invention will be more readily understood in view of the following detailed description and the drawings.

DETAILED DESCRIPTION OF THE INVENTION

FIGS. 7A-7X show logic charts used for programming each set of two PAL chips which control the logic for one interpreter interacting with the simultaneous interpretation system.

DETAILED DESCRIPTION OF THE DRAWINGS

Figure 1:
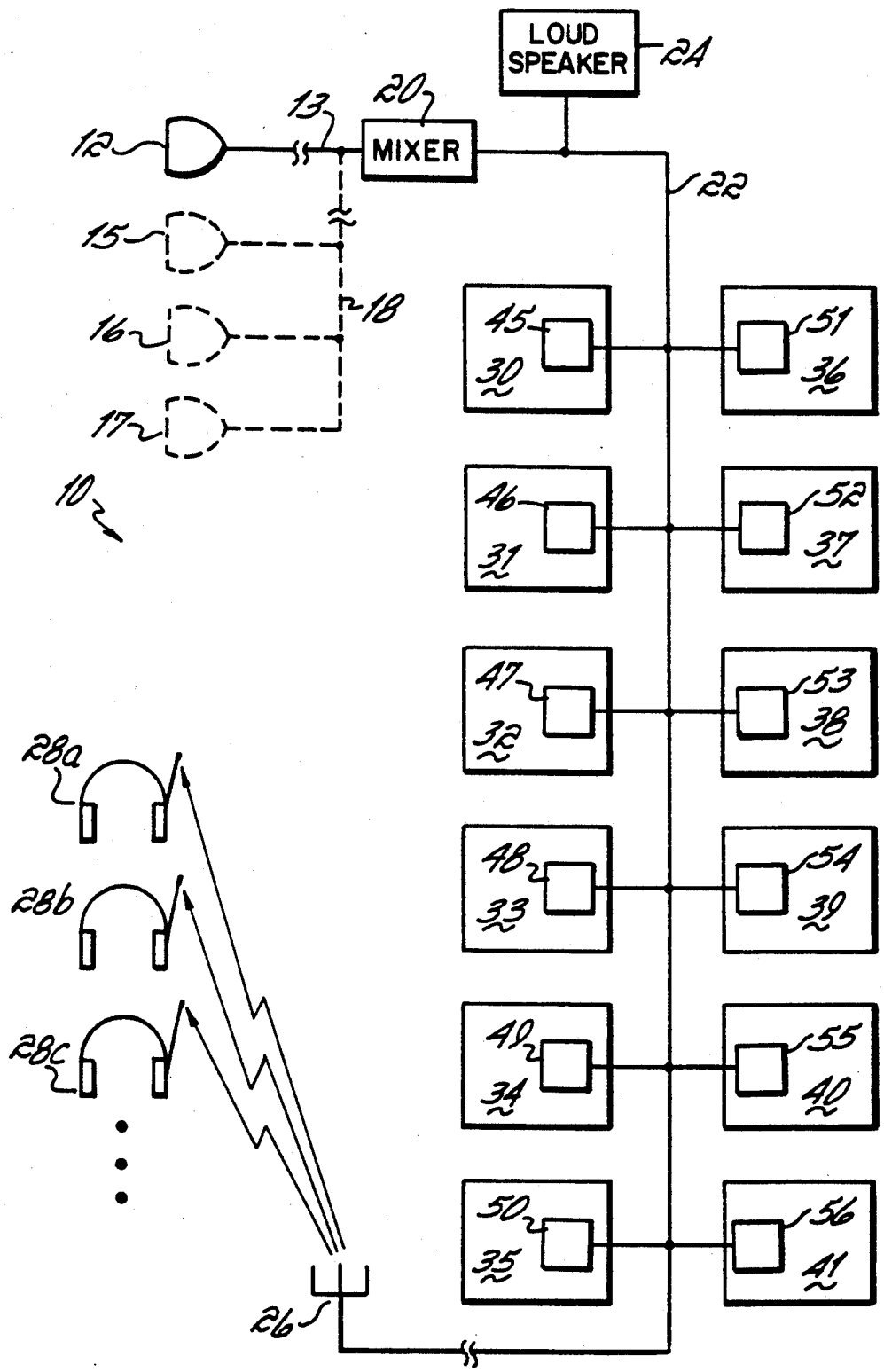
FIG. 1 is a schematic of a simultaneous interpretation system in accordance with one preferred embodiment of the invention.

FIG. 1 schematically shows a simultaneous interpretation system 10 in accordance with one preferred embodiment of that invention. The system 10 includes a microphone 12 into which a speaker speaks a source or floor language. The microphone 12 converts the audio signals of the source language into corresponding electrical signals which are conveyed along an electrical conductor 13. If bidirectional oral communication is to be implemented with this system 10, additional microphones 15, 16 and 17 will also be required. The outputs from microphones 15, 16 and 17 are fed to an electrical conductor 18, which along with conductor 13 terminates at mixer 20. The mixer ensures that electrical signals originating from only one of the microphones 12, 15, 16 or 17 are conveyed therebeyond to an electrical conductor designated FLOOR. The FLOOR conductor resides within a multi-conductor cable or bus 22 which interconnects with the other electrical components of the system 10. If desired, a loudspeaker 24 may be connected to either the mixer 20 or the FLOOR line so that words spoken into one of the microphones may be heard over a loudspeaker 24 system.

The multi-conductor cable 22 operatively connects to an antenna 26 which transmits up to twelve frequency encoded radio signals to headsets 28a, 28b, 28c . . . etc. worn by listeners in the auditorium. Each of the up to twelve different frequency encoded channels usually corresponds to a different language. A listener wearing one of the headsets 28 simply selects the channel that he or she understands, and then adjusts the volume to a desirable level. It is most likely that microphone 12, loudspeaker 24 and the listeners wearing the headsets will be located in an auditorium. If communication is bidirectional, each of the participants will wear a headset, and the participants will be seated around a square or circular table, preferably with at least one of the microphones 12, 15, 16 or 17 accessible by each participant.

Acoustically isolated simultaneous interpretation booths 30-41 are located adjacent to the auditorium so that interpreters may view the floor microphones, but the booths 30-41 are preferably out of the line of sight between the listeners and the speaker. Each of the booths 30-41 includes a simultaneous interpretation station designated generally 45-56, respectively, which is interconnected to the multi-conductor bus 22. Preferably, each booth includes a pair of simultaneous interpreters working as a team. Each station includes two sets of input and output controls, headsets, microphones and microphone switches.

In most cases, each team will be designated for interpretation into one particular language. Thus, an interpreter in a booth will listen to the source language from the FLOOR line, and then interpret another designated language into a microphone, which is then transmitted onto an output-selected LANGUAGE line. The signals on the output-selected LANGUAGE line are transmitted from the antenna 26 to the headsets 28a, 28b, 28c . . . etc., which have been tuned to the channel corresponding to that designated language. If one interpreter does not understand the source language on the FLOOR line, he or she may input select another LANGUAGE conductor from the bus 22 to hear the simultaneous interpretation from another interpreter in another booth who is translating the source language into a language that the first interpreter does understand. The first interpreter then reinterprets, or "relays" the message.

Figure 2:
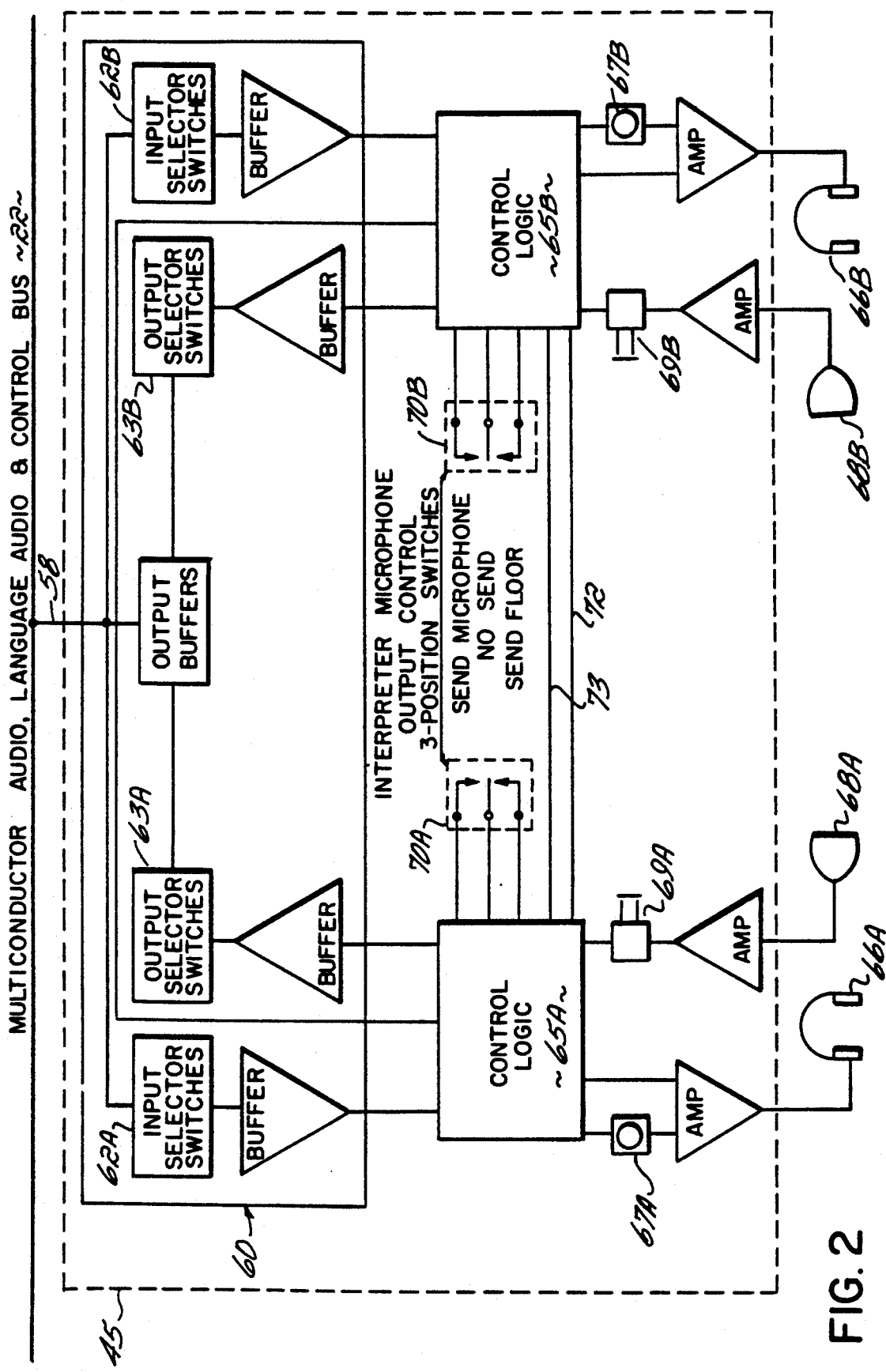
FIG. 2 is a schematic depicting a simultaneous interpretation station interconnected within the simultaneous interpretation system of FIG. 1.

FIG. 2 shows in somewhat more detail the specific components which make up each of the simultaneous interpretation stations. More specifically, FIG. 2 shows a simultaneous interpretation station 45 located in booth 30. Station 45 is identical to the other stations 46-56, except for one preferred embodiment which will be described later, in which station 51 is modified.

FIG. 2 shows a multi-conductor cable 58 connected to bus 22. Cable 58 interconnects bus 22 to the two sets of input and output controls for station 45, shown diagrammatically within block 60, and to the respective left and right controls for the two interpreters working as a team at simultaneous interpretation station 45. Thus, there are two sets of input selector switches, 62a and 62b, and output selector switches, 63a and 63b, for operating the left and the right sides of the station 45, respectively. Control logic for the left and right sides is shown diagrammatically in blocks 65a and 65b, respectively.

Preferably, each input selector switch, 62a or 62b, comprises a pushbutton and a rotary switch. In one position, the pushbutton input-selects the FLOOR line, and in the other position the pushbutton selects the LANGUAGE chosen on the twelve position rotary switch. A light may be used to indicate the status of the pushbutton. Each output-selector switch, 63A or 63B, comprises two twelve position rotary switches which are then ganged together to facilitate flip-flop between two output-selected LANGUAGE lines. Similarly, each of the left and right sides include a headset, 66a or 66b, a volume control for the headset, 67a or 67b, a microphone, 68a or 68b, and a mute/cough button, 69a or 69b, which effectively short circuits the respective microphone. The left and right sides also have a three position microphone switch 70a or 70b. The three positions for the microphone switches, 70a and 70b, correspond to three modes of operation and are designated as SEND MICROPHONE, NO SEND, or SEND FLOOR. However, it is to be understood that other terms would be suitable.

When the microphone switches, 70A or 70B, are in the SEND MICROPHONE position, words spoken into the respective microphone, 68a or 68b, are conveyed to one of the twelve LANGUAGE lines selected on the respective output selector switches, 63A or 63B, by the interpreter. This is an "active" mode where the interpreter listens through the headset to either the source language on the FLOOR line or a relay language on another LANGUAGE line selected by input selector switches, 62A or 62B, and the interpreter interprets another language into the microphone, 68A or 68B, for transmission onto the output selected LANGUAGE line. In this "active" mode, the simultaneous interpreter does not hear any sidetone or audio feedback of his or her voice during interpretation, nor is the interpreter accustomed to hearing such sidetone during simultaneous interpretation.

In the other two positions for the microphone switches, 70A and 70B, corresponding to the NO SEND and SEND FLOOR positions, the respective microphone, 68A or 68B, is no longer in an "active" mode. Voiced or "local" input into the respective microphone, 68a or 68b is effectively disconnected from the output selector switches, 63a or 63b, and routed back to the headset, 66a or 66b, of the interpreter.

In its simplest form, this invention permits selective routing of local audio by a simultaneous interpreter back to his or her headset when the microphone switch is not in an "active" mode. Thus, the simultaneous interpreter receives audio feedback of his or her voice to provide an immediate audible indication of whether or not the microphone is "active", or for all practical purposes, the on/off status of the microphone.

This invention can be implemented with a three position microphone switch, 70A or 70B, through which an interpreter selectively routes electrical signals from microphone, 68A or 68B, either to the bus 22 or to the respective headset, 66a or 66b.

Although in one sense this audible feedback simply provides an audio indication of what could be visually perceived by a simultaneous interpreter via an indicating lamp, it must be remembered that simultaneous interpreters work under intense pressure and time constraints with concentration focused mainly on the audio senses. Thus, audible feedback of this nature serves as a reassurance of where the electrical signals corresponding to words spoken into the microphone, 68a or 68b, are being sent. If an interpreter hears local audio and knows that he or she should be interpreting at that time, he or she immediately knows to flip the switch, 70A or 70B, into the SEND MICROPHONE position. This feature also eliminates concern as to whether or not an indicating lamp is functioning properly.

Another aspect of the invention relates to the interaction between two simultaneous interpreters working as a team. To facilitate oral communication or "prompting" between the interpreters during "dead" time or when one interpreter reaches an impasse, this system 10 routes local audio along lines 72 and 73 between blocks 65A and 65B when both microphone switches 70A and 70B are not in a SEND MICROPHONE position. This enables the interpreters to leave the headsets 66a and 66b on their heads while communicating, so as to not miss the first few words if a speaker from the floor commences speaking. As soon as either one of the members of the team switches microphone switch, 70a or 70b into the SEND MICROPHONE position, this feature is disconnected.

In addition to the schematics shown in FIG. 2, simultaneous interpretation station 45 may include some additional diagnostics and/or volume controls. Such diagnostics would facilitate visual indication to a simultaneous interpreter which of the LANGUAGE lines has been selected by the input selector switch, 62a or 62b, and which of the output selector switches, 63a or 63b, have been selected. Additionally, a multicolored lamp with three colors may be used to indicate the three different positions of the microphone switches 70a and 70b.

Although any one of a number of methods may be used to implement the features of the simultaneous interpretation system 10 of this invention, the system 10 preferably utilizes the buffered outputs of programmed array logic (PAL) chips to drive field effect transistors (FET) switches for controlling routing of audio signals.

According to one preferred embodiment of the invention, one of the simultaneous interpreter stations, for instance station 51 located in booth 36 is modified to provide additional interacting capability with the other stations. This interaction may be used for control function, but is particularly useful in teaching simultaneous interpretation to students in the other booths 30-35 and 37-41. This modified station 51 is referred to as a TEACHER/CONTROL station. According to this embodiment of the invention, an instructor located at the TEACHER/CONTROL station 51 may override the audio transmitted from any of the other stations, regardless of the status, so that the instructor may speak with all of the student/interpreters or only those students who have output selected on switches, 63A or 63B, the same twelve designated LANGUAGE line that the instructor has selected on a rotary, twelve position LISTEN switch at TEACHER station 51.

To implement this embodiment of the invention, the multi-conductor cable 22 carries at least 37 conductors. Fourteen of the conductors are audio lines which convey electrical signals corresponding to spoken words, with twelve designated as LANGUAGE lines, one designated FLOOR and another designated as CONTROL. The CONTROL line conveys the instructor audio to the student. Each of twelve conductors designated as STATUS lines are associated with one of the LANGUAGE lines. When an interpreter uses the output selection switch, 63A or 63B, to select a LANGUAGE line, a one milliamp signal occupies or seizes the STATUS line associated with the selected LANGUAGE line. Thus, the STATUS of line indicates whether or not the associated LANGUAGE line is occupied. If desired, by measuring the actual voltage on a STATUS line, the instructor may obtain an indication as to the number of interpreters who have output-selected via switch, 63a or 63b, a particular LANGUAGE line.

One conductor in cable 77 is referred to as TALK TO STUDENT and is operable via a two-position switch at the TEACHER/CONTROL station 51. Depression of this button SELECTS all of the interpreters who have seized the LANGUAGE line that the instructor has chosen on a rotary LISTEN switch in booth 36. Preferably, each station 45-50 and 52-56 has an indicating lamp that lights when the station has been SELECTED by depression of TALK TO STUDENT.

After depressing TALK TO STUDENT, the instructor may speak over the CONTROL line to the SELECTED students. The signal on the CONTROL line overrides the other audio lines so that the instructor is heard on the headsets. Depression of a two position ALL SELECT button by the instructor enables the instructor to speak over the CONTROL line to all of the interpreters, regardless of their output select position.

Five conductors in cable 22 serve as either power supply lines or as ground. One line supplies power to the FET switches located in each of the simultaneous interpretation stations 45-56 and in TEACHER/CONTROL station 51. Preferably this voltage is about +5 volts dc. Two supply lines carry positive and negative supply voltage for the logic circuitry housed within stations 45-56 and TEACHER/CONTROL station 51. These voltages are preferably about ±12 volts and −12 volts. One of these last five lines serves as a ground for the audio lines, and one serves as a ground for the other components.

It should be noted that each of the audio lines is connected to ground by a 1K ohm loading resistor to allow conversion of the respective electrical signal to one audio signal.

The remaining four lines on cable 22 relate to instructor-operated controls at TEACHER/CONTROL station 51. Depression of a CHIME button by the instructor conveys a signal to the interpreters via the CHIME line. Under correct conditions, i.e., if a CHIME ENABLE signal is present at either the left or right control of a station, an audible signal is heard. The CHIME serves as an audible prompt from the instructor to the students. Preferably, the CHIME signal is also carried on an audio line.

A REMOTE STEP line supplies a clock signal in parallel to each of the simultaneous translation stations 45-50 and 51-56. Depending upon the status on a line referred to as REMOTE UP, the volume either increases or decreases with each clock pulse on the REMOTE STEP line. The REMOTE UP is controlled by a three position spring loaded toggle switch at TEACHER/CONTROL station 51. For this button, the center position is off and the sides are designated "true" or "false". True corresponds to an increase in volume upon receipt of the clock signal, and false corresponds to a decrease in volume upon receipt of a clock signal. Finally, the REMOTE BURST line is controlled by a button which, when depressed, either halves the volume or doubles the volume depending upon whether or not the REMOTE UP switch is true or false.

Figure 3:
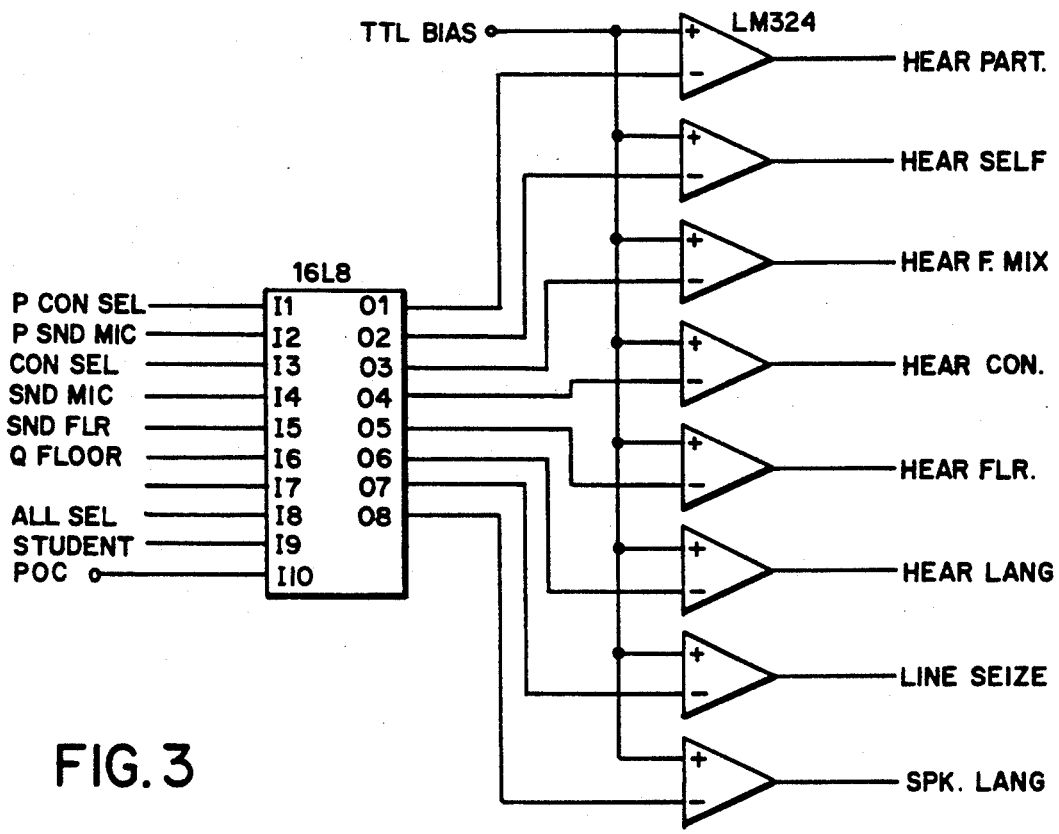
FIGS. 3 and 4 show inputs and outputs for two PALs which control the logic switching between one interpreter at a station and the system. Because each station employs two interpreters, each station includes four of these chips.
Figure 4:
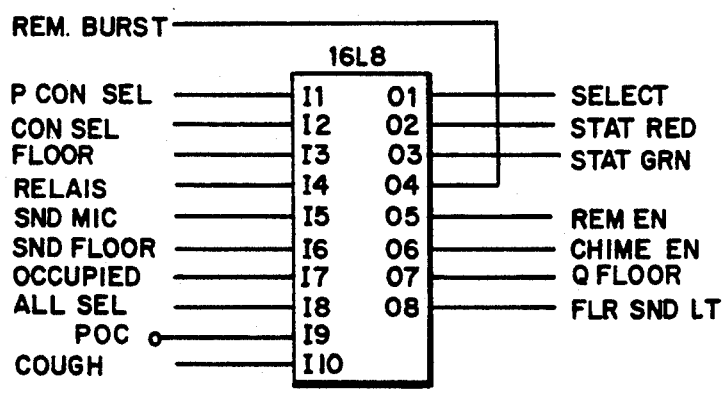

FIGS. 3 and 4 show the inputs and outputs to PALs 75 and 76, respectively. Both the left and the right side of each station 45-50 and 51-56 have two sets of PALs 75 and 76. As shown in FIG. 3, inputs 1 and 2 of PAL 75 connect to lines which indicate the state of the CONTROL line and the SEND MICROPHONE line which feed the controls, 65A or 65B, of an interpreter's partner located in the same booth. Inputs 3 and 4 connect to lines which indicate the state of the CONTROL line and the SEND MICROPHONE line for that particular interpreter. Input 5 is connected to the SEND FLOOR line from the interpreter's microphone. Input 6 is connected to a Q FLOOR flip-flop at the interpreter's control, the output of which indicates whether the interpreter has selected FLOOR or another LANGUAGE line with input selector switch, 62a or 62b. Input 7 is not connected. Input 8 is connected to the ALL SELECT line. Input 9 is connected to the TALK TO STUDENT line. Input 10 is connected to a POWER ON/CLEAR line which clears the PAL 75 when the system 10 is turned on or when power is interrupted. It is to be understood that inputs from audio lines are buffered to the logic circuitry voltage.

Output 1 of PAL 75 actuates the HEAR PARTNER audio mode whereby an interpreter hears his or her partner. Output 2 drives the HEAR SELF audio mode in which an interpreter hears his or her local audio. Output 3 drives the HEAR FLOOR MIX in which the interpreter hears the FLOOR and a selected LANGUAGE line. Output 4 drives HEAR CONTROL mode for hearing audio from the instructor on the CONTROL line. Output 5 drives the HEAR FLOOR audio. Output 6 drives the HEAR LANGUAGE audio for that LANGUAGE line other than FLOOR which has been input-selected on input selector switch, 62a or 62b. Output 7 drives LINE SEIZE to occupy the STATUS line corresponding to whichever LANGUAGE line has been chosen on the output selector switch, 63a or 63B. Output 8 drives the SPEAK LANGUAGE mode for when the interpreter transmits onto a LANGUAGE line that has been selected on the output selector switch 63.

FIG. 4 shows PAL 76 and its interconnected inputs and outputs. Input 1 is connected to the CONTROL line of the interpreter's partner. Input 2 connects to the interpreter's CONTROL line. Input 3 connects to the FLOOR line. Input 4 is fed by an input referred to as RELAIS which indicates when a "relay" language is input selected, rather than the FLOOR line. Inputs 5 and 6 connect to SEND MICROPHONE and SEND FLOOR of the interpreter, respectively. Input 7 connects to an OCCUPIED line, the state of which indicates the condition on the line selected with output switch, 63a or 63B. Input 8 connects to ALL SELECT. Input 9 connects to POWER ON/CLEAR. Input 10 connects to the respective mute/call button, 69a or 69B. Again, some inputs may require a buffer to match the voltage of the logic circuitry.

The first output to PAL 76 drives SELECT indicator which indicates when the interpreter has been SELECTED by the instructor. Outputs 2 and 3 drive a status red indicator and a status green indicator, respectively, which indicate when an interpreter should be transmitting and when he should not be transmitting, respectively. Output 4 enables the REMOTE BURST line. Output 5 enables the REMOTE UP line. Output 6 enables the CHIME line. Output 7 drives a Q flip-flop referred to as QFLOOR, and output 8 drives a FLOOR SEND light.

Logic for REMOTE BURST and REMOTE UP must be separately decoded by the controls, 65A or 65B, at the station, so that the interpreter is not SELECTed when the clock pulse is high.

Figure 5:
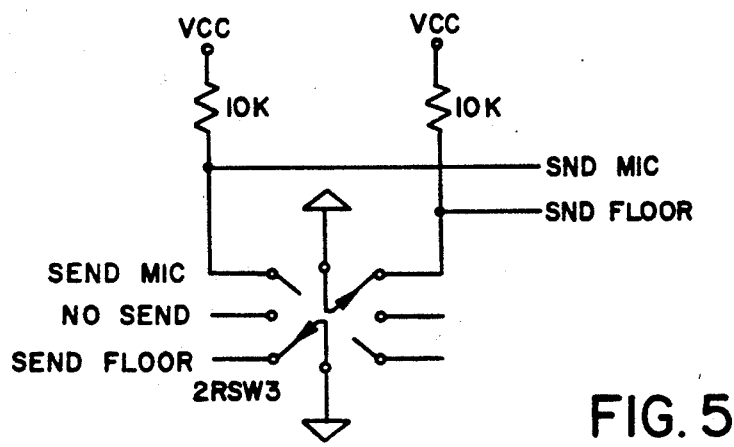
FIG. 5 depicts a three position microphone switch operable by an interpreter to select SEND MICROPHONE, SEND FLOOR or NO SEND for selectively routing voiced messages into the microphone.
Figure 6:
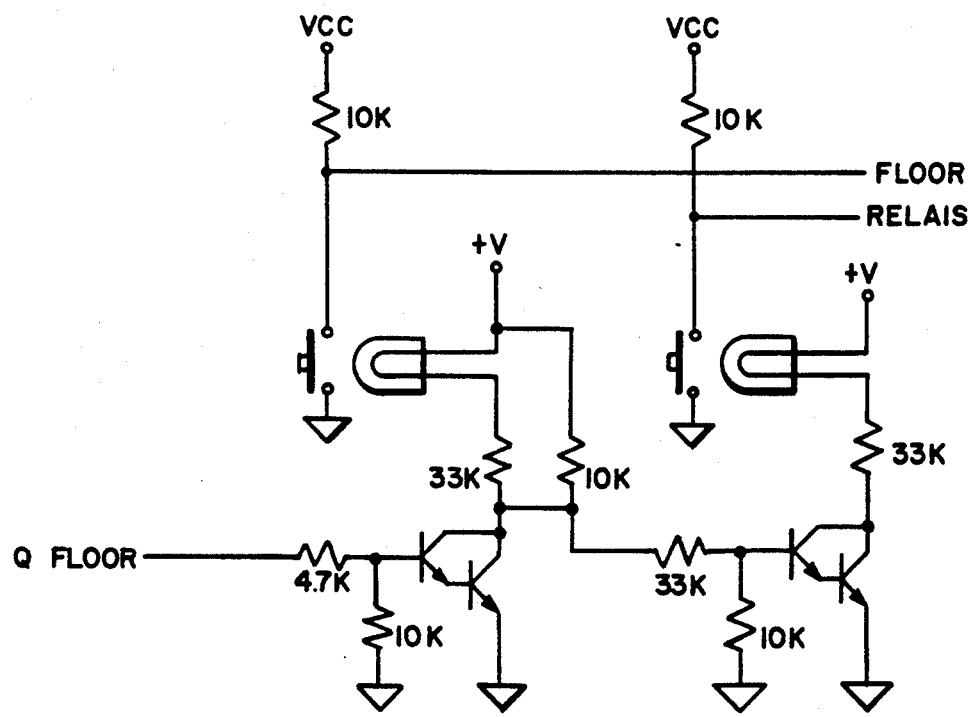
FIG. 6 depicts a portion of the input-select switch operable by an interpreter to receive signals from one of the audio lines designated FLOOR or LANGUAGE.

FIG. 5 shows the microphone switch and, FIG. 6 shows part of the input selector switch, 62a or 62B.

The inter-relationship among the following instructional commands and/or signals were used to derive the digital state charts 7A through 7X for programming both pairs of PALS 75 and 76 in each of the simultaneous interpreter stations 45-50 and 52-56.

The instructor listens to an interpreter speak when the instructor is listening to the LANGUAGE line selected by the interpreter, and the interpreter's microphone switch is in the MICROPHONE position. The instructor can speak to an interpreter whenever TALK TO STUDENT is activated and either ALL SELECT is active or the instructor is listening to the interpreter speak.

The language heard by the interpreter is controlled by the state bit QFloor. When QFloor is true, the FLOOR line is heard. When QFloor is false, the LANGUAGE line selected on switch 62 is heard (Relais high).

FIG. 6 shows normally open pushbutton switches Floor and Relais which control the state of the SR flip-flop QFloor. Pressing Floor makes QFloor true, pressing Relais makes QFloor false. To allow the interpreter to temporarily listen to the floor language, Floor overrides Relais. While both Floor and Relais are pressed, QFloor is true. When one switch is opened after both have been closed together the last switch closed will determine the state of the flip-flop.

When power is first turned on or after an interruption in power, QFloor will be set to the Floor state by the POWER ON/CLEAR signal.

The Floor Send Lamp in the microphone switch 70 will light when either the output selected LANGUAGE line is not occupied or the microphone switch 70 is in either SEND MIC or SEND NONE positions (i.e., this light is off only when the language is occupied and in Send Floor). Preferably a lamp connected to switch 70 has colored filters which control lamp color, with red for SEND MICROPHONE, yellow for SEND NONE and green for SEND FLOOR.

An interpreter station is SELECTED whenever all stations are selected (ALL SELECT) or the instructor is listening to the interpreter speak. SELECT enables the remote gain control of the interpreter microphone gain.

The condition SELECT/TALK TO STUDENT switches the interpreter headphone circuit from either Floor or Relais to the CONTROL line output. This allows an instructor to speak to, and supervise, either individual students by listening to the student interpreter speak, or to speak to all students by use of the ALL SELECT feature.

The interpreter's voice is sent to the LANGUAGE line selected by the output switch 63a or 63b whenever the microphone switch, 70a or 70b, is in the SEND MIC.

These signals control Speak A and Speak B lamps on the interpreter station front panel. The lamps indicate which, if either, of two speak LANGUAGE lines are being transmitted onto. The Speak A lamp lights only if SpeakLang is true and the A/B switch is in the A position. The Speak B switch operates in an analogous manner.

A language is occupied by the interpreter station by applying +1 mA to the appropriate STATUS or Language Occupied line whenever Line Seize is true. Line Seize is true when the MIC SWITCH is in either SEND MICROPHONE or NO SEND position (i.e., not in SEND FLOOR position). A language is occupied whenever any one or more of the interpreters selects that LANGUAGE line with the switch 63A or 63B while the microphone switch 70 is not in the SEND FLOOR position.

An interpreter hears the language selected by the input switch 62A or 62B whenever in Relais with the following exception. If the instructor presses TALK TO STUDENT while the instructor either selects all stations (ALL SELECT) or listens to the interpreter speak, then the interpreter will hear the CONTROL line only.

An interpreter hears the FLOOR line whenever input switch 62A or 62B is on in FLOOR with the following exception. If the instructor presses TALK TO STUDENT while the instructor either selects all stations (ALL SELECT) or listens to the interpreter speak, then the interpreter will hear the CONTROL line only.

The interpreter hears the Floor Mix when in Relais and the microphone switch is in the SEND FLOOR position with the following exception. The FLOOR MIX is not heard if the instructor selects TALK TO STUDENT and ALL SELECT.

An interpreter hears sidetone when either the microphone switch is not in the SEND MIC position of if the instructor presses TALK TO STUDENT and either all stations are selected (ALL SELECT) or the instructor is listening to the interpreter speak.

An interpreter hears his partner only when both partners microphone switches are not in the SEND MIC position and the instructor is not speaking to either the interpreter or partner (i.e., instructor has not set TALK TO STUDENT while either or ALL SELECT or listening to either the interpreter or partner speak).

The interpreter hears the CONTROL line when the TALK TO STUDENT button is pressed and either all stations are selected or the instructor is listening to the interpreter speak.

The Chime sounds when an Attention button is pressed by the instructor and either all stations are selected (ALL SELECT) or the instructor is listening to the LANGUAGE line of either partner at the station (independent of MIC SWITCH position).

REMOTE STEP is the clock signal supplied in parallel to all of the remote gain control circuits. The remote gain is changed in only those circuits that have been selected by the Select signal.

REMOTE UP is the direction control signal supplied in parallel to all of the remote gain control circuits. REMOTE UP true increases gain, while REMOTE UP false decreases gain. The gain adjustment cannot go past either maximum or minimum (no overflow/underflow) and is changed by one step for each cycle of REMOTE STEP while the circuit is enabled by the SELECT signal.

The TALK TO STUDENT signal allows the instructor's microphone signal to be transmitted to the selected interpreter or interpreters (either an individual or a team on a particular LANGUAGE line each with the microphone switch in SEND MIC position, or ALL SELECT to speak to all interpreters).

ALL SELECT controls global access to remote gain adjustment (for gain normalization for instance), attention signal (via chime), and permits the instructor to speak to all student interpreters at once (class dismissed). In each of these three cases another signal is required to initiate the action. These other signals are respectively REMOTE STEP (remote gain switch or gain normalize switch), Chime audio (Attention button), and Student (TALK TO STUDENT switch).

These parameters were used to generate state maps shown in FIGS. 7A through 7X. These Figures show the high or low output of HEAR CONTROL, SELECT, HEAR LANGUAGE, HEAR FLOOR, HEAR SELF, HEAR FLOOR MIX, SPEAK LANGUAGE and LINE SEIZE in the three different microphone positions SEND MICROPHONE, NO SEND and SEND FLOOR, and under all permutations of the states of the QFloor flip-flop (QF), the TALK TO STUDENT (TS), CONTROL line (CS) and ALL SELECT (AS).

Unlike the other station, the CONTROL/TEACHER station 51 only requires one microphone headset and set of controls. To program the PALs located in CONTROL/TEACHER booth 36, the microphone switch varies in that SEND MICROPHONE sends the signal onto the CONTROL line. Thus, no output selected switch is needed. For input, the instructor needs only one twelve position rotary switch for selecting a LANGUAGE Line.

While a preferred embodiment of the invention has been described, it is to be understood that the invention is not limited thereby and that in light of the present disclosure, various other alternative embodiments will be apparent to a person skilled in the art. Accordingly, it is to be understood that changes may be made without departing from the scope of the invention as particularly set forth and claimed.

I claim:

1. A simultaneous interpretation system comprising:
    a multi-conductor electrical bus;
    at least one simultaneous interpretation station connected to the bus and further including;
    a head set adapted to receive a first electrical signal corresponding to a first language from a first of the conductors and to convert said first electrical signal to an audio signal in the first language;
    a microphone for receiving voiced messages in a second language from an interpreter at the station and converting the voiced messages to a second electrical signal conveyed on a second of the electrical conductors when the microphone is in a SEND mode; and
    switch means operatively connected to the microphone for selectively routing said second electrical signal from the interpreter's microphone directly to the interpreter's headset and not to the one or more of the conductors of the electrical bus so that said second electrical signal does not leave the station when the microphone is not in the SEND mode, thereby providing an immediate "local" audio feedback at the interpreter's headset to indicate whether the interpreter's microphone is in a SEND mode and facilitating the interpreter's interpretation from the first language to the second language.

2. A simultaneous interpretation system comprising:
    a multi-conductor electrical bus;
    at least one simultaneous interpretation station connected to the bus and further including;
    a headset adapted to receive a first electrical signal corresponding to a first language from a first of the conductors and to convert said first electrical signal to an audio signal in the first language;
    a microphone for receiving voiced messages from an interpreter at the station and converting the voiced messages to a second electrical signal conveyed on a second of the electrical conductors when the microphone is in a SEND mode;
    switch means operatively connected to the microphone for selectively routing said second electrical signal from the interpreter's microphone directly to the interpreter's headset instead of the one or more of conductors when the microphone is not in the SEND mode, thereby providing an immediate "local" audio feedback at the interpreter's headset to indicate whether the interpreter's microphone is in a SEND mode; and
    a three position switch, a first position of the switch corresponding to a SEND mode, a second position of the switch corresponding to a SEND FLOOR mode for routing said first electrical signal onto said second electrical conductor and a third position of the switch corresponding to a NO SEND mode whereby neither of said first and second electrical signals are routed from the station to the bus.

3. The simultaneous interpretation system of claim 1 wherein the simultaneous interpreter station further comprises:
    a second headset, microphone and switch means interconnected to the first headset, microphone and switch means; and
    means for routing, to both of the headsets, "local" voiced messages spoken into either of the microphones when both of the switch means are not in a SEND mode.

4. The simultaneous interpretation system of claim 1 wherein the multi-conductor electrical bus includes a first conductor designated FLOOR for carrying signals in a source language and a plurality of additional conductors designated LANGUAGE for carrying electrical signals corresponding to additional languages, the invention further comprising:
    input selector means for selectively connecting the headset to one of the FLOOR and the LANGUAGE conductors.

5. The simultaneous interpretation system of claim 1 wherein the multi-conductor electrical bus includes a first conductor designated FLOOR for carrying signals in a source language and a plurality of additional conductors designated LANGUAGE for carrying electrical signals corresponding to additional languages, the invention further comprising:
    input selector means for selectively connecting the headset to one of the FLOOR and the LANGUAGE conductors; and
    output selector means for selectively routing said second electrical signal from said at least one simultaneous interpretation station onto one of the additional designated LANGUAGE conductors.

6. The simultaneous interpretation system of claim 1 and further comprising:
    a teacher station interconnected to the bus, the teacher station further including:
    means for transmitting electrical signals to each of the at least one simultaneous interpretation stations, said transmitting means capable of overriding each of the first electrical signals received by each headset associated with a respective station.

7. The simultaneous interpretation system of claim 6 and further comprising:
    selector means operatively connected to said transmitting means, said selector means providing selectable connection between said teacher station and all of said at least one simultaneous interpretation stations or to those of the stations which are connected to said second electrical conductor.

8. An interpretation station interconnected to a multi-conductor electrical bus in a simultaneous interpretation system, the simultaneous interpretation station comprising;
    a headset adapted to receive a first electrical signal corresponding to a first language from a first of the conductors in the electrical bus and to convert said first electrical signal to an audio signal in the first language;
    a microphone for converting voiced messages in a second language from a simultaneous interpreter at the station into a second electrical signal for conveyance on a second of the electrical conductors when the microphone is in an "active" mode; and a switch operatively connected to the microphone and headset for selectively routing the second electrical signal from the microphone directly to the headset and not to any of the conductors of the electrical bus so that said second electrical signal does not leave the station when the microphone is not in the "active" mode, thereby providing to a simultaneous interpreter at the station an immediate audible indication in the second language of whether the microphone is not in the "active" mode and facilitating the interpreter's interpretation from the first language to the second language.

9. The simultaneous interpretation station of claim 8 wherein the switch includes three positions, a first of the positions corresponding to the "active" mode for directing the second electrical signal to the second conductor.

10. A simultaneous interpretation station interconnected to a multi-conductor electrical bus in a simultaneous interpretation system, the simultaneous interpretation station comprising:
    a headset adapted to receive a first electrical signal corresponding to a first language from a first of the conductors in the electrical bus and to convert said first electrical signal to an audio signal in the first language;
    a microphone for converting voiced messages from a simultaneous interpreter at the station into a second electrical signal for conveyance on a second of the electrical conductors when the microphone is in an "active" mode; and
    a switch operatively connected to the microphone and headset for selectively routing the second electrical signal from the microphone directly to the headset when the microphone is not in the "active" mode, thereby providing to a simultaneous interpreter at the station an immediate audible indication of whether the microphone is not in the "active" mode;
    wherein the switch includes three positions, a first of the positions corresponding to the "active" mode for directing the second electrical signal to the second conductor, a second of the three positions corresponding to a FLOOR SEND mode for routing said first electrical signal in the first language to the second electrical conductor, and a third of the three positions corresponding to a NO SEND position whereby neither said first nor said second electrical signal is routed to the second electrical conductor.

11. The simultaneous interpretation station of claim 10 and further comprising:
    a second headset, microphone and switch interconnected with the first headset, microphone and switch; and
    means for interconnecting the microphones and headsets so that "local" voiced messages spoken into either of the microphones are conveyed to both of the headsets when both of the switches are not in "active" mode.

12. The simultaneous interpretation station of claim 11 and further comprising:
    input selector means for selectively receiving said first electrical signal from one of the FLOOR and the LANGUAGE conductors.

13. The simultaneous interpretation station of claim 11 and further comprising:
    output selector means for selectively routing said second electrical signal onto one of the LANGUAGE conductors.

14. A simultaneous interpretation system comprising:
    a floor microphone for generating a source language on a first electrical conductor;
    a multi-conductor bus housing at least some portion of the first electrical conductor and a plurality of additional conductors;
    at least one simultaneous interpreter station operatively connected to the bus, each station further including:
    a headset adapted to receive an electrical signal in a first language from a selected one of said first electrical conductor and said additional conductors;
    a microphone adapted to convert an interpreter's voiced message in a second language into an interpreter electrical signal; and
    a two-mode microphone switch adapted to selectively route the interpreter electrical signal to an output-selected one of the additional conductors when in a first mode and directly to the headset and not to the one or more of the conductors of the electrical bus when in a second mode so that the interpreter electrical signal never leaves the station in the second mode, thereby providing an immediate "local" audio feedback at the interpreter's headset to indicate whether the interpreter's microphone is in a SEND mode and facilitating the interpreter's interpretation from the first language to the second language.

15. The simultaneous interpretation system of claim 14 and further comprising:
    a teacher station equipped with a headset and microphone, the teacher station further including:
    selective receiving means for receiving an electrical signal carried on a selected one of said additional conductors; and
    means for transmitting a teacher voiced signal to each of said at least one simultaneous interpreter stations.

16. The simultaneous interpretation system of claim 14 wherein each said station further comprises:
    a second headset, second microphone and second microphone switch interconnected to said headset, said microphone and said microphone switch, respectively, each of the microphone switches adapted to route interpreter electrical signals to both said first and said second microphones when both said switches are not in said first mode.

* * * * *